Figure 1:
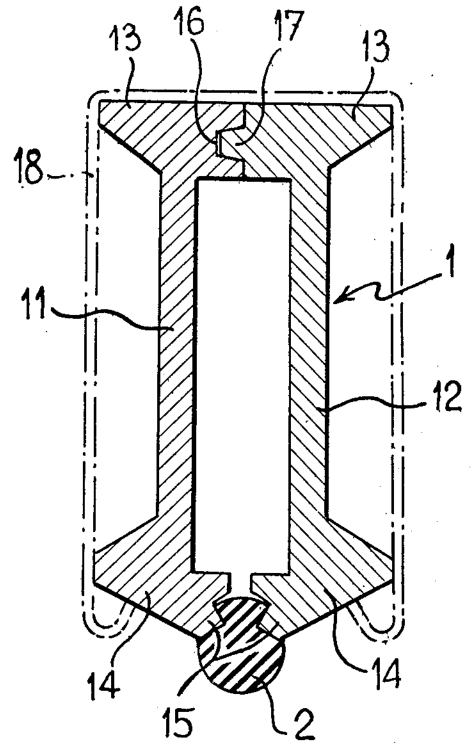

United States Patent [19]

Bommart

[11] 3,985,211

[45] Oct. 12, 1976

[54] OVERHEAD RIGID POWER CONDUCTOR

[76] Inventor: Patrick T. Bommart, 4, Avenue Talma, 92 Rueil-Malmaison, France

[22] Filed: Feb. 7, 1975

[21] Appl. No.: 547,888

[30] Foreign Application Priority Data

Jan. 6, 1975 France .............................. 75.00226

[52] U.S. Cl. ................................ 191/25; 191/23 A; 191/30; 191/40; 238/143

[51] Int. Cl.² ........................................... B60M 1/34

[58] Field of Search ............. 191/22 R, 23 A, 29 R, 191/30, 32, 40, 41, 25; 339/22 B, 22 T; 174/99 R, 99 E, 99 B; 248/63, 74 A; 238/10 F, 143

[56] References Cited

UNITED STATES PATENTS

| | | | |
|---|---|---|---|
| 1,207,459 | 12/1916 | Wolfe | 191/41 |
| 2,278,761 | 4/1942 | Benbow | 191/30 |
| 2,863,009 | 12/1958 | Robinson | 191/23 A |
| 3,334,197 | 8/1967 | Boden | 191/40 |

*Primary Examiner*—Trygve M. Blix
*Assistant Examiner*—Reinhard J. Eisenzopf
*Attorney, Agent, or Firm*—Alan H. Levine

[57] ABSTRACT

A rigid power conductor to be suspended from an overhead structure or ceiling by means of insulators for the supply of electric energy to electric power driven vehicles on rails. The conductor is a conductor wire held between two side-by-side I-beams urged together so as to form a continuous clamp for the wire.

The wire has lateral grooves whereas the I-beams define a conforming downwardly opening slot with projections engaging the grooves in the wire.

The joints connecting the successive I-beams are longitudinally displaced, and an expansion joint is disclosed which permits relative displacement of the successive lengths of conductor.

There is also disclosed an apparatus for the installation of the conductor wire and various devices for interconnecting the I-beams.

18 Claims, 16 Drawing Figures

OVERHEAD RIGID POWER CONDUCTOR

The present invention deals with a rigid power conductor as used in overhead installation for supplying electrical energy to electric power-driven vehicles including vehicles on rails, and more particularly the invention concerns a rigid power conductor for replacing conventional catenaries for the supply of electrical energy in public transportation systems of the subway or high-speed types.

The main object of this invention is to provide a rigid power conductor structure which affords with minimum space utilization a better mechanical rigidity and increased energy supply capacity in an arrangement that is compatible with simple switching and expansion joint installations.

In accordance with a particular embodiment of this invention, the rigid power conductor comprises a conductor wire and a hollow, generally rectangular closed structure for supporting the wire and consisting of at least two constant cross-section I-beams wherein the closed structure is supported by spaced-apart insulators. The head portions of the I-beams bear directly against one another along their respective side surfaces while their foot portions engage into lateral grooves in the conductor wire which defines an electrical contact for a moving energy pick-up element. The power conductor also comprises clamping means for urging the I-beams toward one another, and the I-beams are shaped and dimensioned in such a way as to co-operatively define the above-mentioned generally rectangular closed structure.

In a particular embodiment, the head portions of the I-beams have complementary groove-and-tongue profiles for their respective levelling of the I-beams during installation. The hollow structure presents an inner space which is generally rectangular in cross-section and the power conductor includes splints for connecting the successive I-beam sections. The connecting points between the successive I-beam sections of one I-beam are longitudinally spaced from those of the other I-beam and the power conductor may comprise a protective housing which covers the rectangular structure.

Expansion joints are provided between the successive lengths of power conductor, and each joint comprises at least two short sections of power conductor retained parallel to one another in a horizontal plane and spaced apart just sufficiently for receiving therebetween and for guiding the extremity of the adjacent power conductor lengths. Each expansion joint also includes a flexible cable for electrically interconnecting the conductor wires of the adjacent power conductor lengths. Each expansion joint may include a rigid plate which supports the short sections of power conductor, and sliding guide members with layers of anti-friction material may be disposed between the contacting sides of the short sections at each expansion joint.

In another particular embodiment, the clamping means consists of a resilient clamping means for constantly urging the I-beams together while permitting their temporary separation for insertion of the conductor wire. The invention also provides a method for the installation of a power conductor as described above which comprises the following sequential steps; namely, placing the two I-beams in position, progressively locally spreading the foot portions of the I-beams in a given direction along the power conductor, introducing the conductor wire in the I-beam spreading area, and allowing self-return of the I-beam foot portions to their conductor wire clamping position over the conductor wire.

A mobile apparatus for the installation of the conductor wire in accordance with the above-noted method is also disclosed which comprises a frame adapted to move along the power conductor by rolling on the flanges of the I-beams, spreading rollers for locally spreading the foot portions of the I-beams and various guide rollers for supporting the conductor wire and insuring proper alignment thereof relative to the I-beams.

Figure 2:
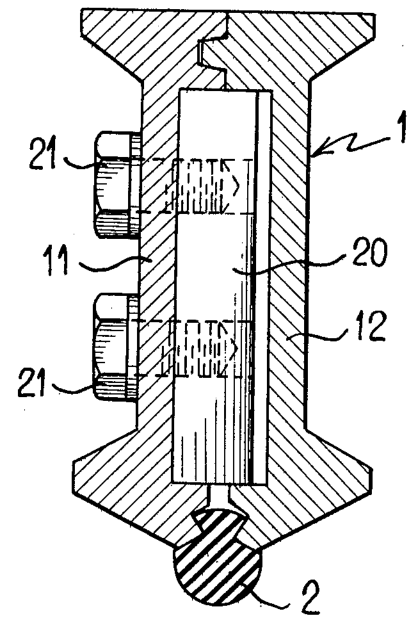
Figure 3:
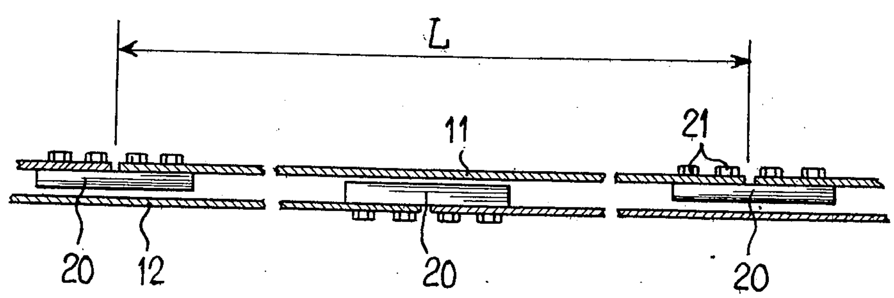
Figure 4:
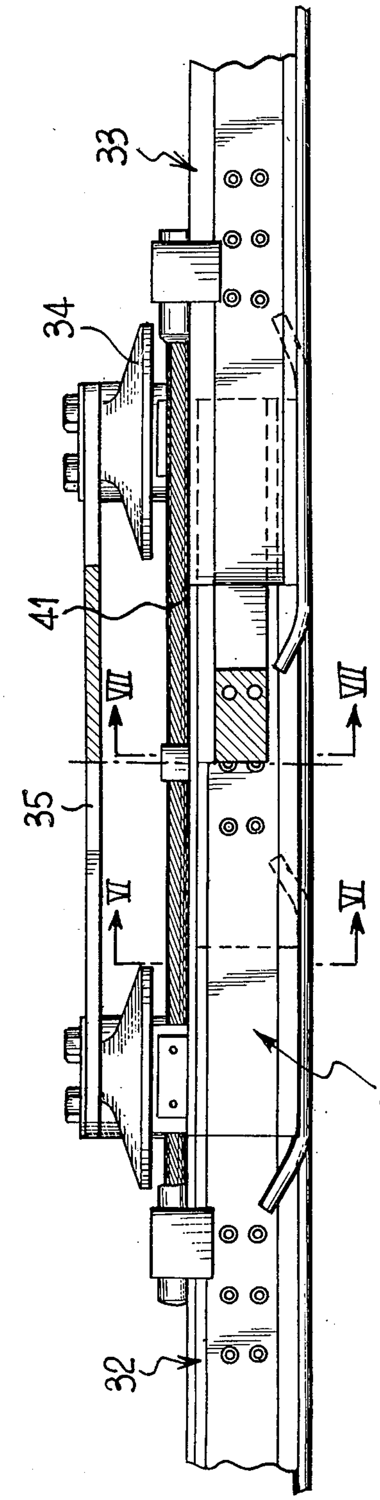
Figure 5:
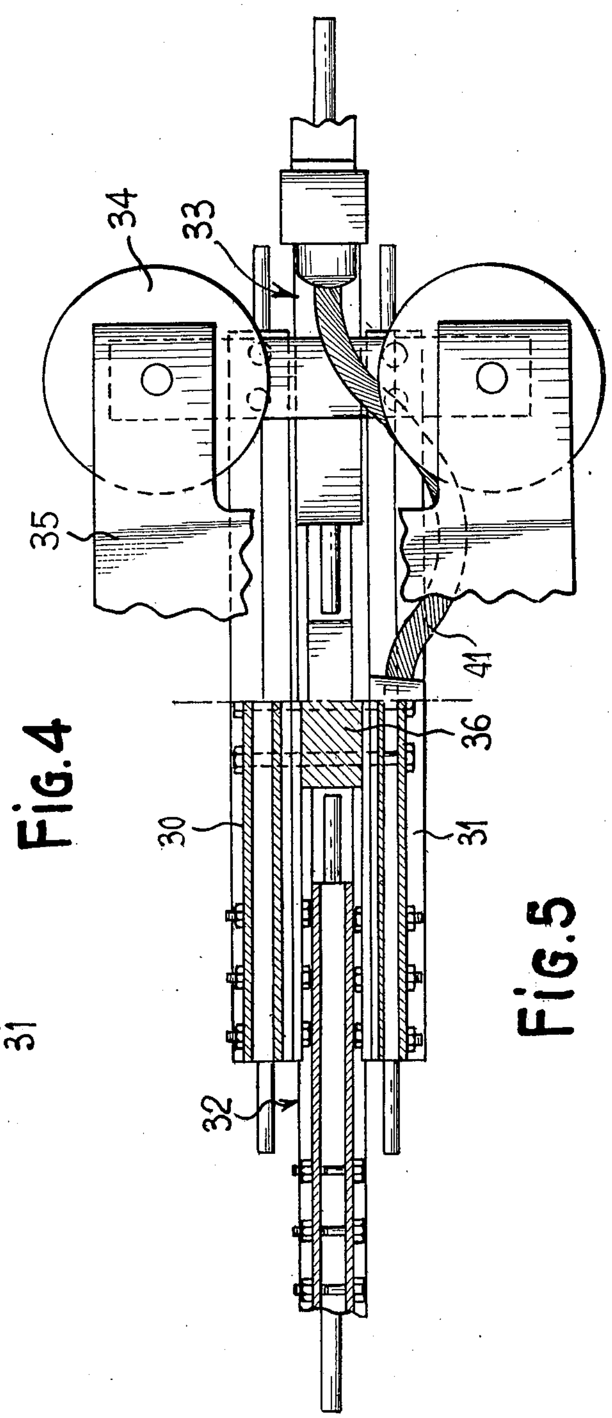
Figure 6:
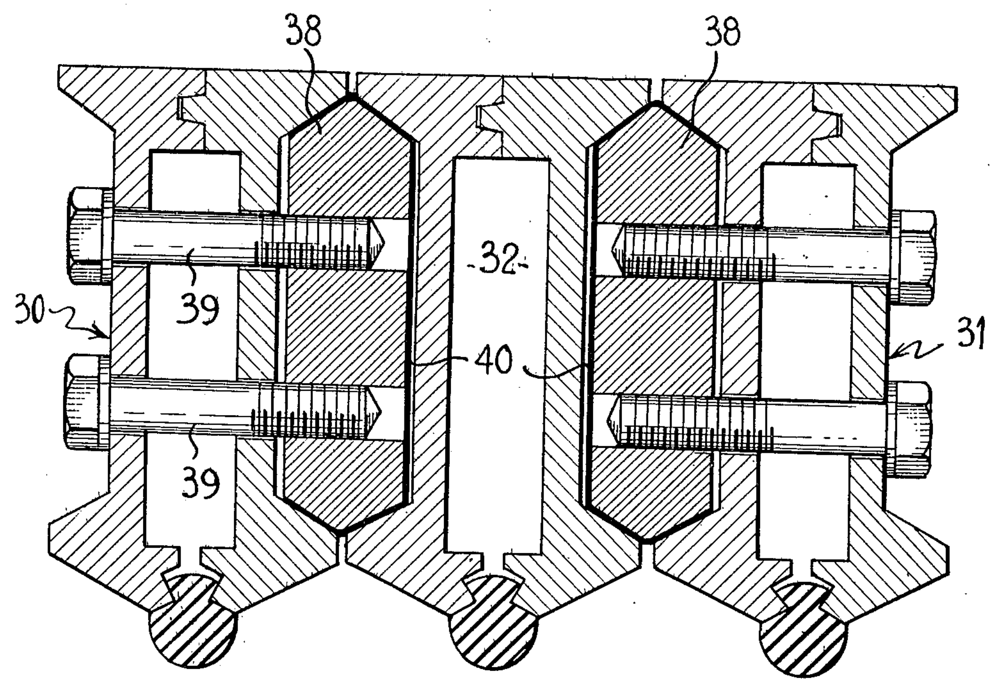
Figure 7:
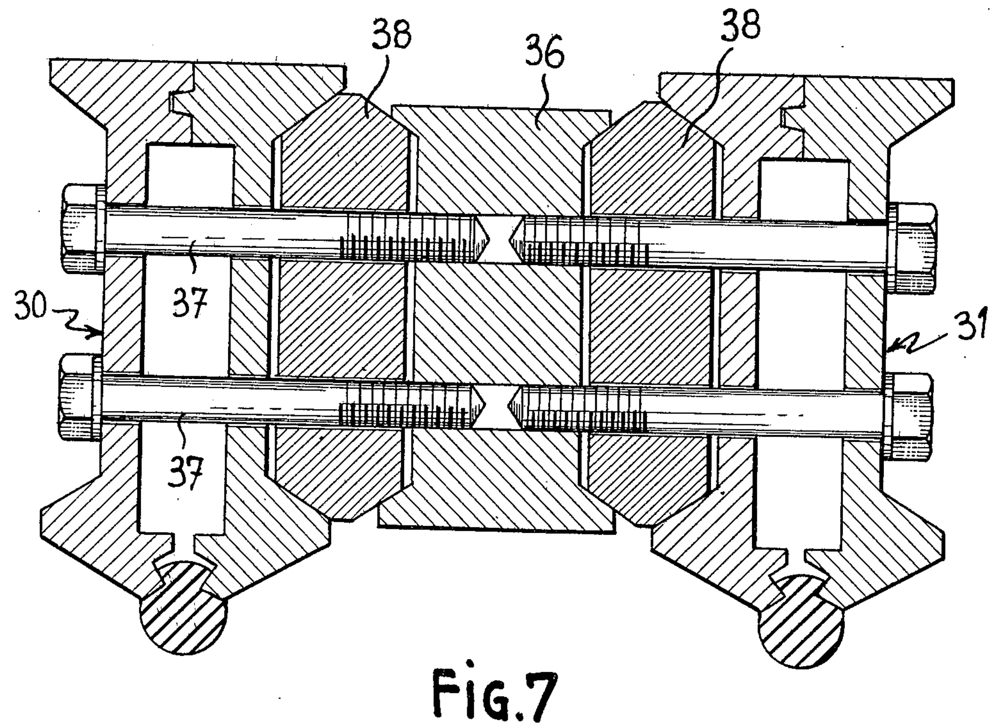
Figure 8:
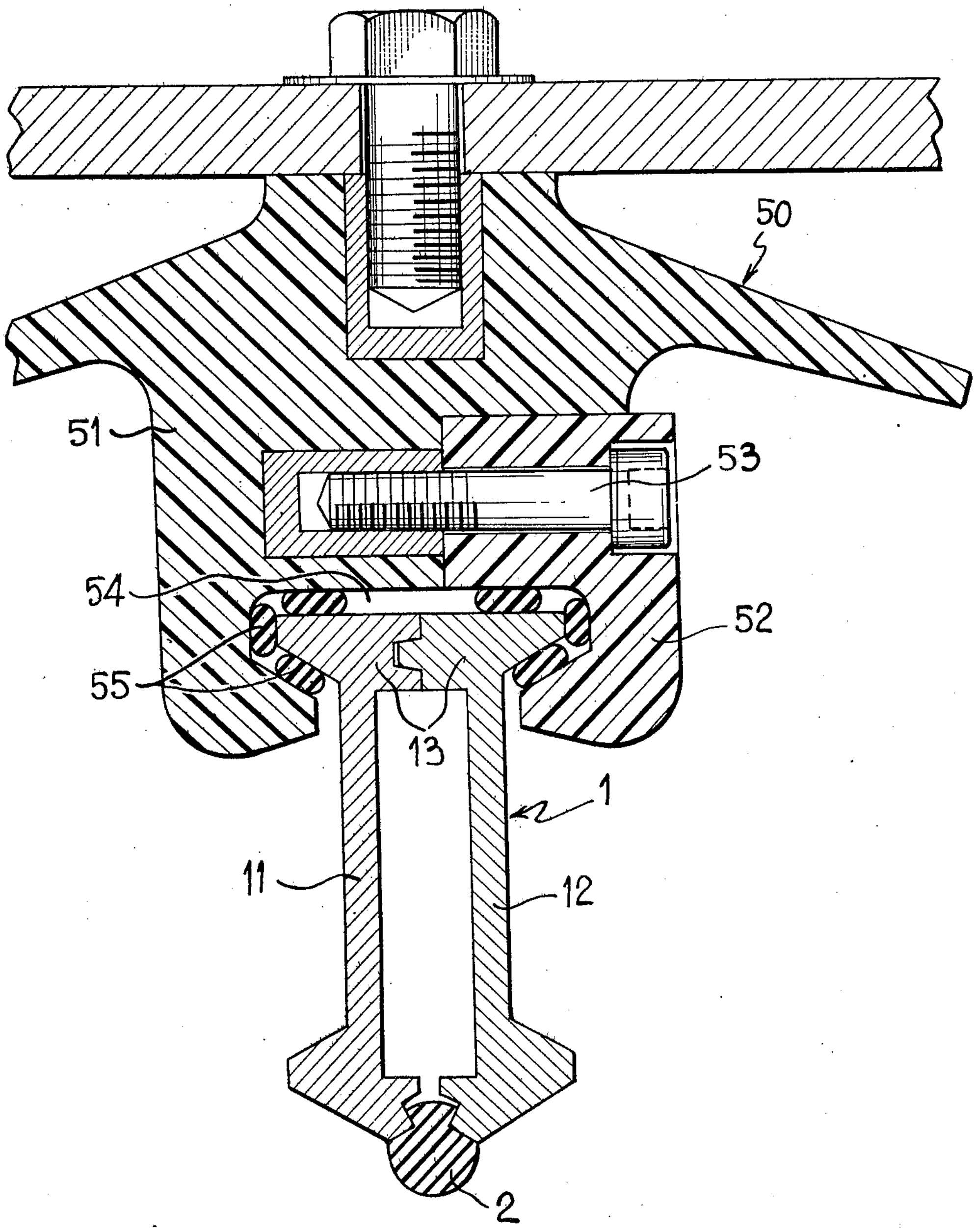
Figure 9:
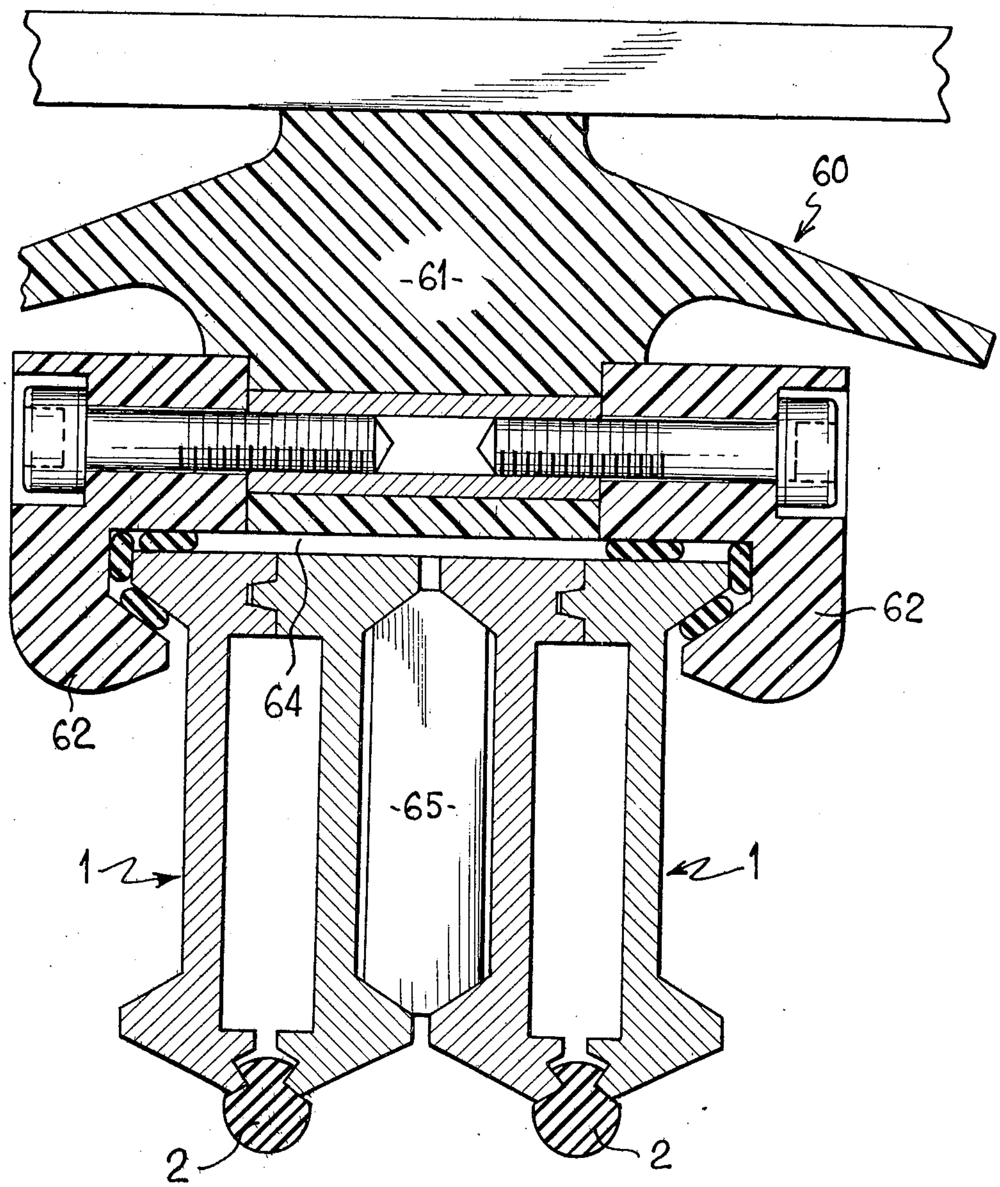
Figure 10:
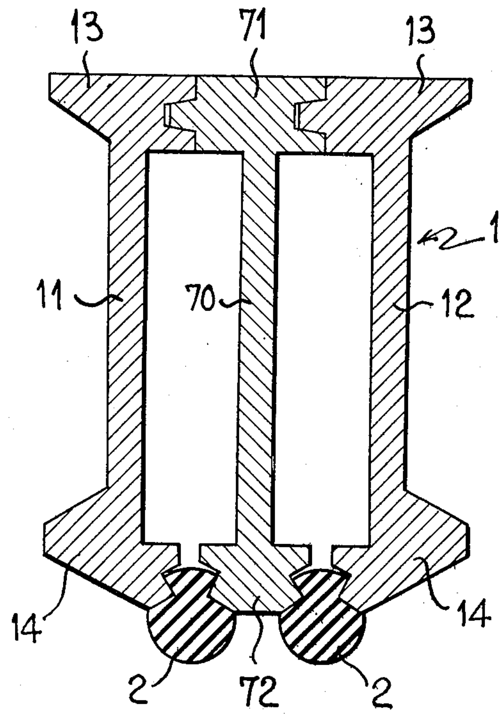
Figure 11:
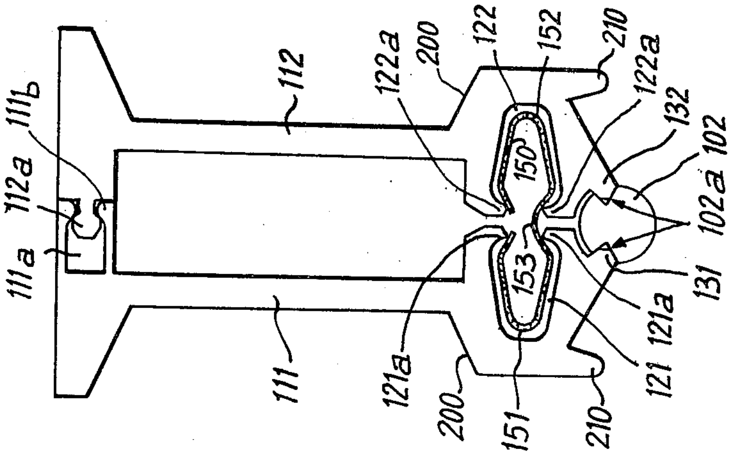
Figure 12:
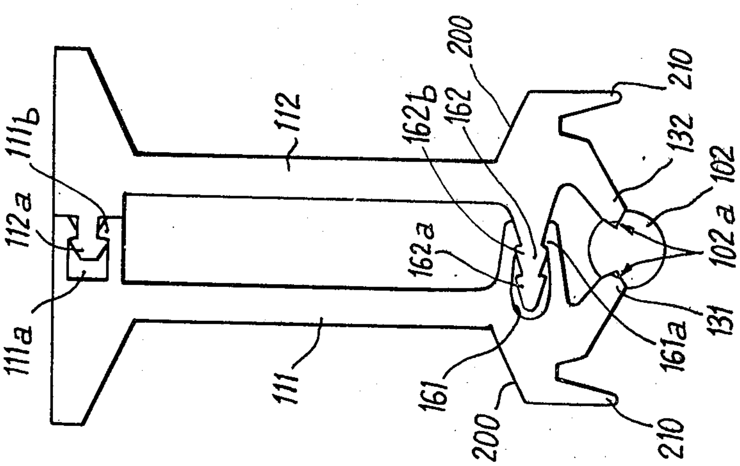
Figure 13:
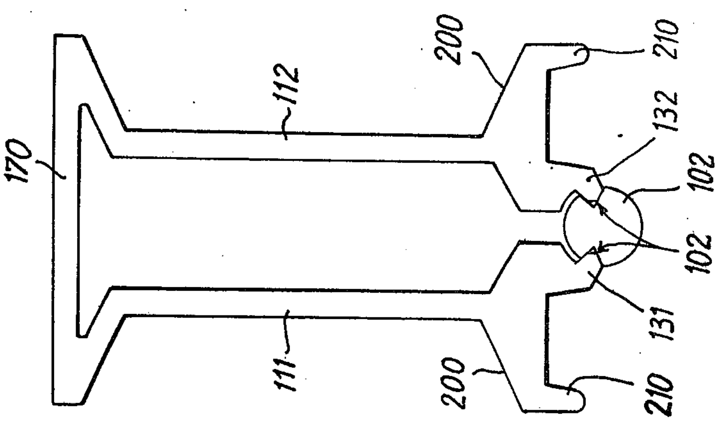
Figure 14B:
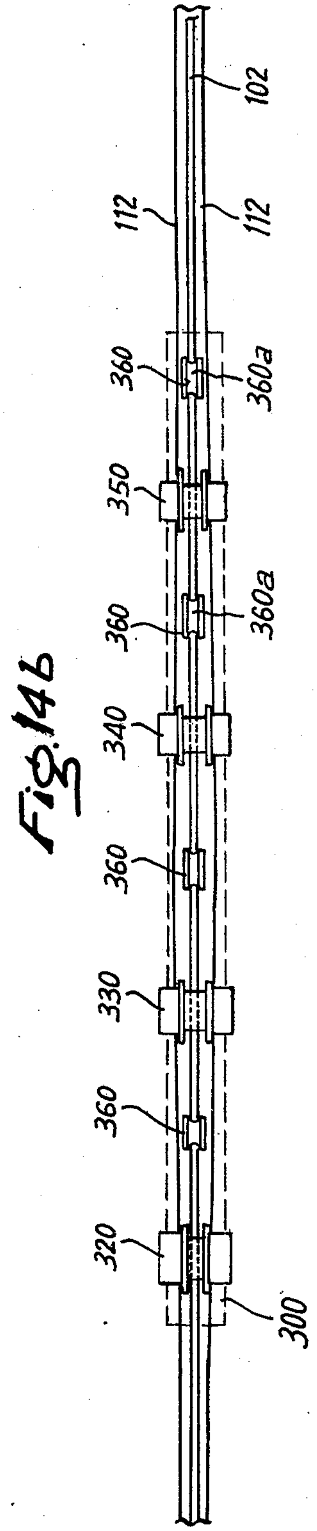
Figure 14A:
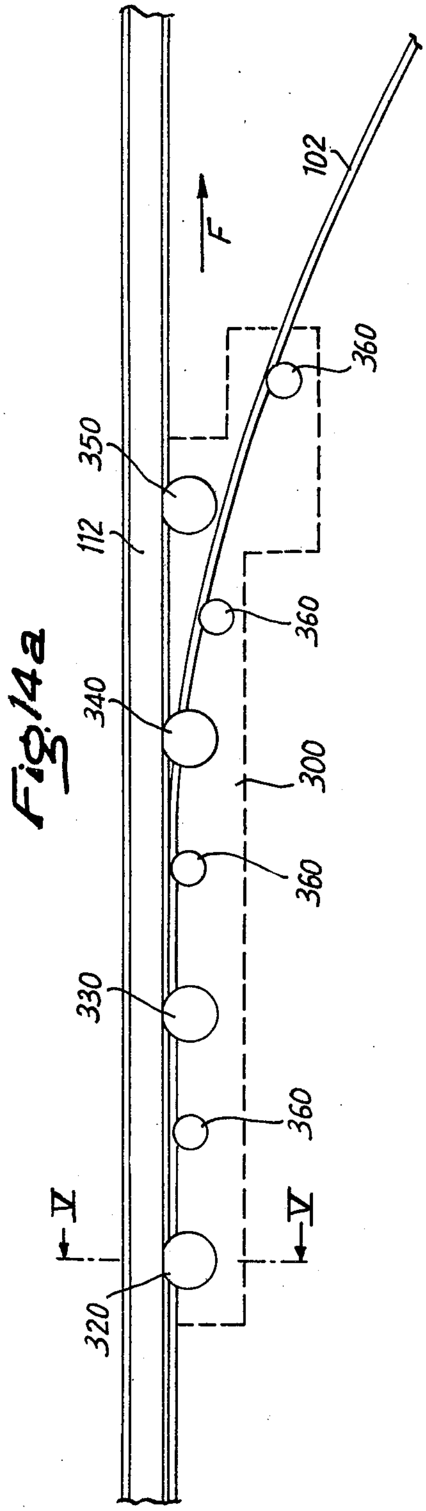
Figure 15:
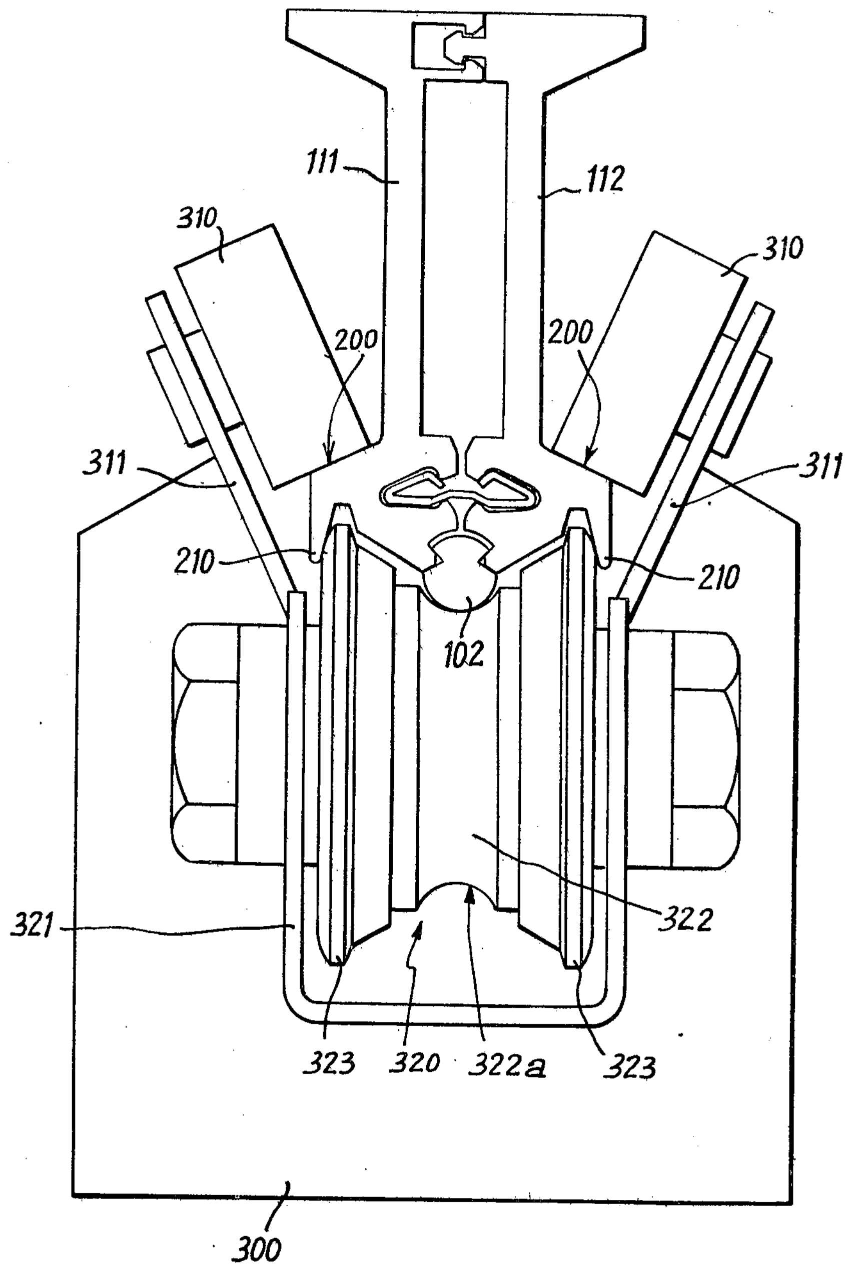

An illustrative embodiment in accordance with this invention will now be described in connection with the accompanying drawings wherein:

FIG. 1 is a cross-sectional view of a power conductor in accordance with this invention, FIG. 2 is a similar illustration but taken through a region where a splint interconnects two successive sections of the left hand side I-beam, FIG. 3 is a schematic illustration in plan view and at reduced scale of a power conductor illustrating the alternate positioning of the splints, FIG. 4 is a side elevational view with parts taken away, showing an expansion joint, FIG. 5 is a top view of the embodiment shown in FIG. 4 with the left hand side portion illustrated in cross section, FIGS. 6 and 7 are transverse cross-sections of the expansion joint illustrated in FIGS. 4 and 5 but taken respectively along lines VI—VI and VII—VII shown in FIG. 4, FIG. 8 is a transverse cross-sectional view of a power conductor in accordance with this invention but taken through one of the supporting insulators, FIG. 9 is a view similar to FIG. 8 but in relation to a power conductor illustrated in FIG. 1, FIG. 10 represents in a similar fashion a variation of the power conductor illustrated in FIG. 1, FIG. 11 is a schematic transverse cross-section of a power conductor in a first preferred embodiment, FIG. 12 is a similar representation of a power conductor but in accordance with a second alternative, FIG. 13 is yet another similar view but of a third alternative wherein the I-beams are innerconnected at their head portions by means of an integral bridge, FIG. 14*a* is a side schematic view illustrating a mobile apparatus for the installation of the conductor wire as maybe used in relation to any of the structures shown in FIGS. 11, 12 and 13, FIG. 14*b* is a schematic bottom view of the apparatus shown in FIG. 14*a*, and FIG. 15 is a schematic transverse cross-sectional view taken along line XV—XV in FIG. 14*a* showing the power conductor and certain components of the apparatus for the installation of the conductor wire.

A power conductor in accordance with this invention is illustrated in the accompanying figures and in particular in FIG. 1. It comprises a conductor wire 2 for example made of tin covered copper and of a conductor body 1 which is made up of two constant cross section shapes 11 and 12 generally symmetrical and generally I shaped. The conductor wire 2 constitutes a contact wire for the transmission of electrical energy to the mobile pick-up device of the vehicle, for example the wiping bar of a pantograph as used on electric power driven vehicles.

I-beams 11 and 12 which are preferably made of an aluminium alloy are disposed side by side and maintained one against the other by clamping means which are not shown in FIG. 1 and include for example resilient clamping means and possibly bolting as well such as to constitute a rigid structure in the shape of a hollow beam. The head portions 13 of I-beams 11 and 12 bear directly one against the other along their lateral faces and their foot portions 14 terminate in claws or gripping ridges 15 which engage in correspondingly shaped grooves into conductor wire 2. Wire 2 is thus positively retained in place along its entire length both in the vertical direction and in the horizontal direction by the foot portions of the I-beams 11 and 12 which are urged together by suitable clamping and tightening means. The hollow beam structure, on the other hand, has excellent mechanical rigidity. Moreover, the use of all metal components having high electrical conductivity insures maximum electrical energy capacity. In addition, an examination of the accompanying drawings will immediately reveal that this type of power conductor will require minimum overhead space.

In order to insure exact leveling of I-beams 11 and 12 relative to one another during installation, it is advantageous to provide a tongue-and-groove profile on their mating surfaces as at 16 and 17 in FIG. 1 where a slightly V shaped groove 16 is shown with a closely conforming projection or rib 17 which fit into one another.

FIG. 1 also illustrates the use of a protective covering 18 made of insulating material for covering all faces of the generally rectangular beam structure 1. This covering, which is required only in those sections of a power conductor disposed in a tunnel for insuring sufficient electrical insulation relative to the structure of the tunnel while reducing the distance between the power conductor and the ceiling of the tunnel, will preferably be installed in the form of elements whose length correspond to the distance between the successive supporting insulators, and this arrangement in individual lengths will reduce the problems associated with different thermal expansion coefficients.

FIGS. 2 and 3 illustrate a system of splints for the construction of a power conductor in accordance with this invention. Each one of I-beams 11 and 12 which constitute the conductor body 1 is made up of a series of I-beam sections connected to one another by splints 20 which are flat plates located within the generally rectangular hollow space defined by the juxtaposed I-beams. With reference to FIG. 3 wherein the length of a particular I-beam section is illustrated by the letter L, it will be seen that in accordance with this invention, the various I-beam connecting points are longitudinally spaced apart in one I-beam relative to the other and this arrangement provides better rigidity in the conductor body 1 by eliminating local weaknesses at the junction of successive I-beam sections. In addition, this arrangement practically eliminates all possible variation in vertical positioning of a conductor wire which might cause jumping of the pantograph as it passes under such joints. The arrangement also enhances the electrical energy capacity of the power conductor by the elimination of simultaneous interruptions of the I-beams which constitute the conductor body 1.

In order to provide for thermal expansion of the power conductor, expansion joints are provided at approximately every 250 meters of line which distance, however, is given purely as an illustration of a suitable arrangement where the conductor wire is a single strand wire whose tendancy is to generally follow the expansion of the I-beams 11 and 12. Between the adjacent extremities of the length of power conductor, one must provide for an expansion which can reach as much as 150 mm. The mechanical and electrical interconnections of the extremities of successive lengths of power conductor is obtained by means of an expansion joint as illustrated in FIGS. 4 to 7 of the accompanying drawings.

The illustrated expansion joint essentially comprises two short sections of power conductor 30 and 31 of generally the same construction as the main power conductor, and these short sections are disposed parallel to one another in the same horizontal plane and are sufficiently spaced apart to receive between them and to guide the extremities 32 and 33 of the adjoining lengths of power conductor. The short sections 30 and 31 are secured directly or through an electrical insulator 34 to a horizontal rigid plate 35 which maintains them in relative position in the horizontal plane and in the vertical plane. The mechanical relationship of the various components in such an expansion joint can be improved by providing a central separator 36 to which the short lengths 30 and 31 are connected as by bolts 37. Between these short lengths 30 and 31 which are thus rigidly positioned relative to one another and relative to the central separator 36 are inserted sliding guide members 38 which extend all along the expansion joint for guiding the extremities 32 and 33 of the adjacent power conductor lengths. Screws or bolts 39 are used to secure the guide members 38 to the respective short lengths of power conductor 30 and 31. As more particularly seen in the cross-sectional view in FIG. 6, guide members 38 conform generally to the exterior surfaces of the conductors as particularly defined by I-beams 11 and 12. A layer of antifriction material 40, for example, polytetrafluorethylene, also identified by the trade mark Teflon, can be advantageously interposed between the mating surfaces of guide members 38 and the I-beams as such layers of anti-friction material will facilitate the relative longitudinal displacements due to the effect of thermal expansion.

The electrical interconnection between extemities 32 and 33 of the adjacent power conductor lengths is effected by means of a flexible cable 41 connected to the upper region of the expansion joint components and suitably connected to the power conductor lengths. As more particularly illustrated in the elevation view of FIG. 4, the conductor wires of the expansion joint are at the same level as the conductor wires of the adjoining power conductor lengths and this arrangement eliminates any possible interruption in the vertical positioning of the contact member of the pantograph. It will also be observed that since the arrangement is secured by means of screws and bolts, the replacement of used conductor wires can be easily effected.

Under the same principle as that which has just been described in relation to expansion joints, switching joints can be realized except that certain components will necessarily be electrical insulators and no flexible cable as at 41 will be required. The adjoining extremities of the lengths of power conductors will, of course, have to be sufficiently far apart in order to prevent the possibility of short circuiting by the wiping element of the pantograph.

A power conductor in accordance with this invention can be advantageously supported by the ceiling of a tunnel by means of spaced apart insulators as represented in cross-section in FIG. 8 of the drawings. This insulator 50 comprises a fixed element 51 integrally formed with the skirt and a removable element 52 which is connected to element 51 by means of screw 53. The two components of the insulator define a downwardly directed constricted opening 54 generally conforming to but slightly larger than the combined head portion of I-beams 11 and 12. The connection between the conductor body 1 of the power conductor and insulators 50 can be obtained by means of a plurality of shims 55 such as those described by the applicant in his French Pat. No. 7,209,437 and which consist of an outer envelope having a low friction coefficient and an elastic inner filling. Such a connection will ensure the damping of vibrations and the free displacement due to the thermal expansion.

FIG. 9 of the drawings represents a different embodiment in which insulator 60 comprises two removable elements 62 symmetrically disposed on either side of the central fixed portion 61 relative to a median plane, and they define therewith a wider constricted opening which can receive two power conductors separated by a spacer 65 and each being associated with a conductor wire 2. This variation permits local strengthening of the power conductor by doubling the conductor wire in those sections of a line where more energy is required; for example, at the starting points in the train stations or where important gradients are encountered. It should be obvious that for added capacity, more than two parallel power conductors can be used in a particular application.

It may also be considered useful in certain applications to provide a power conductor line using a double conductor throughout the network in order to increase the contact area with the energy pick-up device, and FIG. 10 illustrates how this double power conductor can be realized in accordance with another embodiment of this invention. The conductor body 1 comprises three I-beams disposed in a parallel side-by-side relationship and clamped together, including two lateral I-beams 11 and 12 which it will be seen are identical to those used in the previously described embodiments, and a central I-beam 70 whose head portion 71 and whose foot portion 72 are shaped to match with those of the lateral I-beams 11 and 12. Between the foot portions 14 of the lateral I-beams 11 and 12 and the foot portion 72 of the central element 70, two identical conductor wires 2 are engaged and clamped in position. Compared to the previously described embodiment illustrated in FIG. 9, this alternative requires an additional I-beam using a particular configuration but this arrangement on the other hand is advantageous in that it uses fewer components and is less costly than the overall doubling arrangement shown in FIG. 9. It will become apparent that the variation illustrated in FIG. 10 can also be extended to support more than two parallel conductor wires simply by increasing correspondingly the number of central I-beams 70.

In FIGS. 11, 12 and 13, the two I-beams 111 and 112 are always resiliently urged towards one another to retain conductor wire 102.

In FIGS. 11 and 12, I-beams 111 and 112 are interconnected by a snap lock which is made of a male portion 112*a* that co-operates with a female cavity 111*a* whose opening is restricted as at 111*b* to a size less than the maximum size of male portion 112*a*. Upon introduction of the male portion 112*a* into the female portion 111*a*, the components will sufficiently yield as to permit insertion and locking in place and once assembled a pivot connection is obtained which permits slight separation of the respective foot portions of I-beams 111 and 112.

In FIG. 11, the foot portions of I-beams 111 and 112 are both provided with an inwardly directed restricted V-shaped cavity 121 and 122 presenting lip portions 121*a* and 122*a*. Conductor wire 102 is clamped between ridges or claws 131 and 132 which co-operate with conforming grooves 102*a* and conductor wire 102. The foot portions of I-beams 111 and 112 are constantly urged together by means of the resilient clip 150 which comprises two opposed V-shaped portions 151 and 152 connected together by integral bridging region 153. Portion 151 bears against the edges at 121*a* while portion 152 bears against the corresponding opposite edges 122*a*.

In FIG. 12, one of the I-beams (111) is provided with a female cavity 161 into which a male counterpart 162 on the opposite I-beam (112) can be inserted, the male element 162 having two series of conical shoulders 162*a* and 162*b* while the female cavity 161 is provided with constricting lip portions 161*a* which can yieldingly co-operate with the shoulders 162*a* and 162*b* on the male projection 162.

In FIG. 13 the two I-beams 111 and 112 are integrally connected to one another by means of a bridge as at 170 which defines a unitary structure that can be produced by extrusion. The intrinsic elasticity of the materials of this extrusion should be sufficient to insure resilient clamping of conductor wire 102 by foot portions 131 and 132.

In relation to FIGS. 14*a*, 14*b* and 15, a preferred method of installation of a conductor wire 102 will now be described in association with a conductor body comprising I-beams 111 and 112 as illustrated in any of FIGS. 11 to 13.

A mobile apparatus 300 is supported and guided for rolling along the conductor body by means of rollers 310 supported by arms 311 which rollers 310 roll along the flat surfaces 200 of the flanges of I-beams 111 and 112.

The apparatus 300 is also provided with a plurality of wire inserting and spreading rollers for the installation of conductor wire 102, and these include rollers 320, 330, 340 and 350. FIG. 15 illustrates the structure of such a roller 320 but the same construction is used for the other rollers noted above. In addition, a series of small cables supporting rollers 360 are provided each having a groove 360*a* into which the grooved conductor wire 102 will pass. Each spreading roller, such as that shown at 320 (FIG. 15) is rotatably supported to a U-shaped frame 321. This roller has a central region 322 provided with a conforming groove 322*a* corresponding to the profile of wire conductor 102, and two lateral flanges 323 which bear against the side edges 310 of I-beams 111 and 112 (which edges 210 also serve to protect the conductor wire 102 against gripping). Depending upon the spacing between the opposed flanges 323 in each of the spreading rollers 320, 330, 340 and 350, the I-beams 111 and 112 will be more or less separated one from the other preferably, as illustrated, spreading rollers 320 and 350 providing a slight resilient separation of the I-beams whereas spreading rollers 330 and 340 providing maximum spreading sufficiently to permit the introduction of conductor wire 102. This gradual introduction of the wire is obtained by moving the apparatus 300 in the direction of the arrow. The conductor wire 102 which is fed by a spool (not shown) passes over the various rollers and is gradually locally introduced along the length of the conductor body. This particular installation of a conductor wire 102 is easy and economical.

The combination of the grooves 360*a*, 322*a*, 332*a*, etc., of the various rollers operate in a manner similar to a drawing die and this causes straightening and unwinding of the conductor wire 102.

Once the installation is completed, conductor wire 102 is retained in place under the effect of the clamping, but for more certainty, cross-bolting at spaced-apart locations can be effected.

What is claimed is:

1. A rigid power conductor of the type used to supply electric energy to electric power driven vehicles, the power conductor comprising:

a. a conductor wire defining an electrical contact adapted to be engaged by a moving electric pick-up element, said conductor having two lateral grooves, b. at least two constant cross-section I-beams arranged in side-by-side relationship to define a hollow generally rectangular closed structure, each I-beam comprising a series of longitudinally successive I-beam sections and each I-beam having a head portion and a foot portion, the head portions of said I-beams bearing directly against each other along their facing side surfaces, the foot portions of said I-beams engaging said lateral grooves, respectively, in said conductor wire, c. clamping means for urging said I-beams toward each other, d. a plurality of splints within said hollow structure, each splint interconnecting two successive I-beam sections, the splints interconnecting the I-beam sections of one of said I-beams being longitudinally offset from the splints interconnecting the I-beam sections of the other of said I-beams.

2. A rigid power conductor as defined in claim 1 including insulators for supporting said I-beams, said insulators being spaced apart along the length of said I-beams.

3. A rigid power conductor as defined in claim 1 including a protective covering over the top and sides of said hollow generally rectangular closed structure.

4. A rigid power conductor as defined in claim 1 wherein one of said facing side surfaces of the head portions of said I-beams has a longitudinal tongue and the other facing side surface has a cooperable longitudinal groove, said tongue being accommodated within said groove.

5. A rigid power conductor as defined in claim 1 wherein the power conductor comprises a series of longitudinally successive lengths, and including an expansion joint between each two successive power conductor lengths, each expansion joint comprising at least two short power conductor sections arranged parallel to each other and laterally spaced apart in the same horizontal plane, the extremities of two successive power conductor lengths being arranged between said two short sections, and a flexible cable electrically interconnecting said power conductor lengths.

6. A rigid power conductor as defined in claim 5 wherein each said expansion joint includes a horizontal rigid plate above said short sections, and means for securing said short sections to said plate.

7. A rigid power conductor as defined in claim 5 wherein a closed cavity is defined between the extremity of each power conductor section and the short section on each side of it, and including a guide member in each of said cavities, each guide member being fixed to one of said power conductor extremity or its respective short section and slidable with respect to the other.

8. A rigid power conductor as defined in claim 7 including layers of anti-friction material between each guide member and the short section and power conductor extremity between which the guide member is located.

9. A rigid power conductor as defined in claim 1 wherein said clamping means includes means for resiliently urging said I-beams toward each other while permitting temporary separation of said I-beams so that said conductor wire can be inserted between them.

10. A rigid power conductor as defined in claim 9 wherein said resilient urging means urges said I-beams toward each other with a force sufficient to maintain said conductor wire between them without the need for additional fasteners.

11. A rigid power conductor as defined in claim 9 wherein said resilient clamping means comprises an integral bridge between said I-beam head portions, said bridge interconnecting said two I-beams.

12. A power conductor as defined in claim 9 wherein said resilient clamping means comprises a snap connection between the head portions of the I-beams, and a resilient clip interconnecting the foot portions of said I-beams.

13. A power conductor as defined in claim 12 wherein said resilient clip consists of two opposed V-shaped heads and a bridge therebetween.

14. A power conductor as defined in claim 9 wherein said resilient clamping means comprises a first snap connection between the head portions of said I-beams and a second snap connection between the foot portions of said I-beams.

15. A method of assembling a rigid power conductor comprising two I-beams and a conductor wire gripped between the foot portions of the I-beams, the method comprising the steps of:

a. arranging the two I-beams in side-by-side relation, b. progressively locally spreading the foot portions of the I-beams in a longitudinal direction along the power conductor, c. progressively introducing the conductor wire into the space between the spread foot portions, and d. allowing the I-beam foot portions to move toward each other to grip the conductor wire between them.

16. A mobile apparatus for assembling a rigid power conductor comprising two I-beams and a conductor wire gripped between the foot portions of the I-beams, the apparatus comprising:

a. a frame, b. rollers carried by said frame and adapted to roll along the lower flanges of the I-beams, and c. roller means for engaging and locally spreading the foot portions of said I-beams as said frame moves along the I-beams.

17. A mobile apparatus as defined in claim 16 wherein said spreading roller means comprises a series of spreading rollers each of which includes a central region for supporting said conductor wire, and said mobile apparatus also includes conductor wire guide rollers.

18. A mobile apparatus as defined in claim 17 wherein said spreading roller means and said guide rollers have a conductor wire receiving circular groove that closely conforms to the shape and dimension of said conductor wire for straightening and unwinding same.

* * * * *